March 10, 1942.                S. J. ZAND                2,275,712
PRESSURE DIAPHRAGM
Filed April 22, 1939
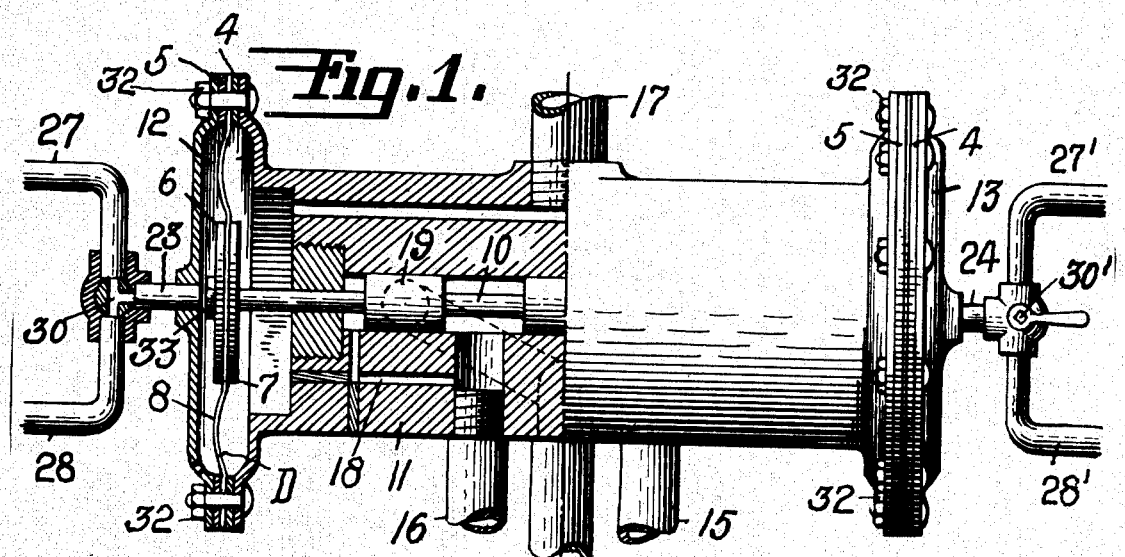
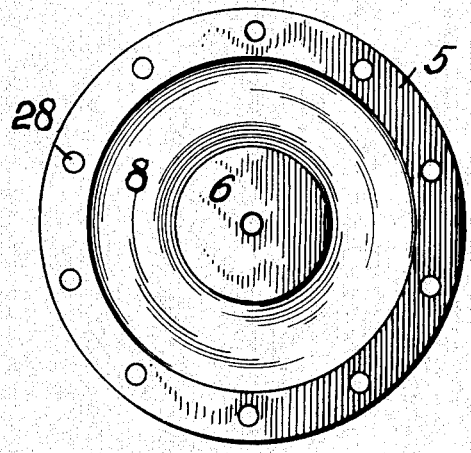
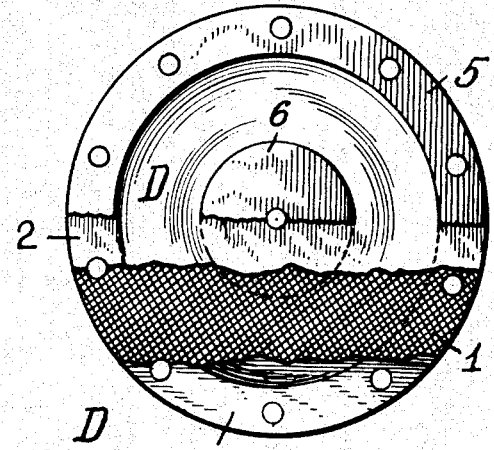
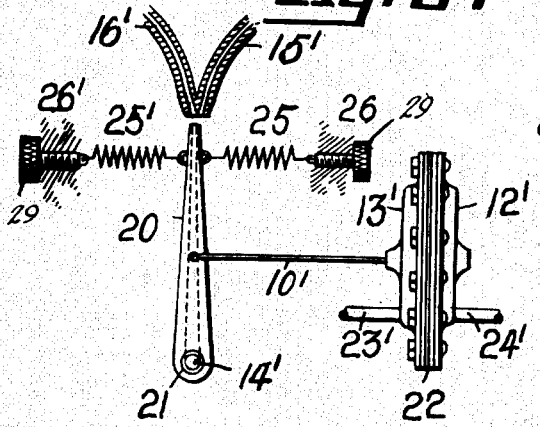
INVENTOR
STEPHEN J. ZAND
BY
Herbert H. Thompson
HIS ATTORNEY.

Patented Mar. 10, 1942

2,275,712

UNITED STATES PATENT OFFICE 2,275,712

PRESSURE DIAPHRAGM

Stephen J. Zand, Forest Hills, N. Y., assignor to Sperry Gyroscope Company, Inc., Brooklyn, N. Y., a corporation of New York Application April 22, 1939, Serial No. 269,525

3 Claims. (Cl. 137—157)

This invention relates to sensitive diaphragms used to act as pistons for the moving of a control member in response to the differential fluid pressure on the two sides of a diaphragm. Such diaphragms should not only possess the utmost sensitivity, but be rugged enough to withstand fairly high pressure. They should also be impervious to gases or liquids.

Diaphragms at present on the market are not well suited for my purposes as most of them possess a centralizing influence; that is, appreciable force is required to displace the center of the diaphragm from its neutral position against the resilience of the membrane used in the diaphragm. Such diaphragms also have a tendency to cant or tilt under pressure, and thus cause side thrust on the piston rod or link to which they are connected.

By my present invention, I largely avoid the above mentioned difficulties and provide a gas-tight and liquid-tight diaphragm capable of withstanding considerable pressures, yet having no centralizing effect and thus permitting movement of the connected control member with a minimum of change of pressure on the diaphragm.

Referring to the drawing,

Fig. 1 is a side elevation, partly in section, of a relay valve employing two of my diaphragms, one at each end, for operating the piston valve of the relay.

Fig. 2 is a plan view of one of my two diaphragms.

Fig. 3 is a similar view with parts or layers broken or torn away to show the interior construction.

Fig. 4 shows the method employed in manufacturing my improved diaphragm, by which a centralized position of the diaphragm is avoided.

Fig. 5 is a diagrammatic view showing my diaphragm as employed to operate a jet pipe form of controller.

Referring first to Figs. 2 and 3, my diaphragm proper D is preferably formed of a plurality of layers of material, a central layer 1 of woven or knitted fabric such as cloth, and outer layers 2 and 3 of two sheets of rubber or rubber substitute, which are pressed under heat and pressure into the cloth to impregnate the cloth and form the core of a unitary reenforced rubber faced diaphragm. Two outer metal rings 4 and 5, and also two inner discs 6 and 7 reinforce the periphery and central portion of the diaphragm, as indicated in Fig. 4, the rubber being bonded to at least one and preferably both of the rings or outer members and also at least one and preferably both of the discs or inner members so that the complete diaphragm has the appearance shown in Fig. 2, with the metal rings and central discs permanently attached to the rubber. Said rings are preferably pierced as at 28 to receive the clamping nuts and bolts 32. Obviously, the discs and/or the rings may be made of any suitable sheet material besides metal, if desired, as long as it has the requisite stiffness and will bond to the rubber.

Preferably, the diaphragm is put under strain by uniform pressure applied in one direction to the central discs as indicated by the arrows in Fig. 4, during the bonding and impregnating and curing process so that the discs are surrounded by an annular portion 8 of the flexible but relaxed or somewhat limp diaphragm having no tendency to hold the disc in any definite position within the limits of movement of the discs up and down in Figs. 2 and 3 or to the right or left in Fig. 1. Such a diaphragm may be said to be "fulled" so that axial movement will not require stretching of the material, the only resistance to movement being the bending resistance of the thin diaphragm. The fullness allowed, however, is not great, being only sufficient to permit the proper movement of the valve stem 10 to which the diaphragm is connected.

If desired, the bonding, stretching and impregnating steps may all be carried out simultaneously, so that a stretched diaphragm is produced in one operation, or separate steps may be employed.

Two of my diaphragms are shown as used in a relay valve in Fig. 1, each diaphragm having its discs 6 secured by a nut 33 at their center to the piston rod 10 of the relay valve 11. As shown, said valve is a pneumatic-hydraulic valve in which air pressure is introduced into the outside of each diaphragm through pipes 23 and 24, which lead to the differential air pick-off on the control device or devices (not shown). Where two such devices are employed, the pick-off on one, for instance, the directional gyroscope, is connected to the chamber through pipe 27 and the pick-off on the other, for instance, a rate of turn gyro, is connected through pipe 28, the two supplies being mixed through the shut-off mixing valve 30 connected to pipe 23. Liquid pressure is preferably employed as the servo fluid, the pressure entering through pipe 14 and out through one or the other of the pipes 15 or 16 leading to the servo motor (not shown), while the sump pipe is shown at 17. This particular type of relay valve is self-balancing in that the pressure supplied to the servo motor through pipes 15 and 16 is used as a follow-back connection or opposing device to oppose the pressures supplied by the air in the chambers 12 and 13 to the diaphragms in each. To this end there is shown a small bypass connection 18, whereby the pressure in the pipe 16 is led behind the left-hand piston valve 19. A similar connection is provided on the opposite side of the valve. Such a valve is shown more in detail in the copending application of applicant and T. W. Kenyon, Serial No. 149,136, now Patent No. 2,210,917, for Reactive servo system for automatic pilots, granted August 13, 1940.

Air is shown as led from the control device or devices (not shown) into chamber 12 through a pipe 23, and the opposing air through opposite pipe 24. One control instrument is connected to the pipe 23 through pipe 27 and the other through pipe 28, while the pipe 24 is shown similarly connected to the opposite controls on said instruments through pipes 27' and 28'.

A slightly different application of my fluid diaphragm is shown in Fig. 5, wherein the link or piston rod 10' is connected to move a jet pipe 20 about a pivot 21, which pipe receives fluid under pressure from pipe 14' and discharges it differentially into pipes 15' and 16'. In this case, instead of employing two separate chambers 12 and 13, as in Fig. 1, the two chambers 12' and 13' are placed on the two sides of the central diaphragm 22, the air supply pipes being shown at 23' and 24'. The jet pipe is normally centralized only by springs 25, 25', so that the central position of the jet pipe may be readily varied by having the outer end of the springs connected to threaded shafts or set screws 26, 26'. Since the diaphragm has no centralized position, it will readily be apparent that the neutral position of the jet pipe may be accurately adjusted by turning the knurled heads 29 of the shafts 26, 26'.

From the foregoing it will be apparent that I have produced by my invention a pressure responsive diaphragm which is at once extremely sensitive and yet sufficiently strong to withstand all ordinary operating pressures. The bonding of the rubber to the metal rings and discs also has a great advantage over the prior types of reënforced diaphragms, in which the discs are merely placed on the diaphragm and clamped to the same by bolts and nuts. This results in uneven tension around the periphery, depending upon the tightness with which the nuts are screwed down, and with such construction it is impossible to know exactly what tension the clamping bolts are placed under. In my design, on the other hand, the metallic discs and rings are permanently secured to the diaphragm so that the tightness or looseness of the clamping bolts and nuts 32 and 33 does not affect the operation of the diaphragm.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A diaphragm having a fabric reenforced resilient core of substantially uniform thickness, a fixed connecting ring to one side of which the core is circumferentially bonded, a movable connecting disc bonded at its side to the central portion of the core, the free part of the resilient core between the ring and disc being fulled radially during manufacture of the diaphragm so that when the same is normally positioned the free part of the core is relaxed and offers no initial resistance to axial movement of the movable connecting disc.

2. A diaphragm having a resilient core of substantially uniform thickness made of a fabric material impregnated and faced on both sides with a rubberlike substance, a fixed connecting member in the form of a ring, made of comparatively rigid material, to which the resilient core is bonded at one of the side faces thereof so that the ring forms an integral circumference defining portion of the diaphragm, a movable connecting member in the form of a disc, made of comparatively rigid material, to which the core is bonded at one of the side faces thereof to also form the disc as an integral portion of the diaphragm, said disc being situated at the center of the circumferentially defined core, the free part of the core between the ring and disc being fulled radially during the process of manufacture of the diaphragm so as to leave the same in a normally relaxed condition which permits the movable connecting member of the diaphragm to have a limited degree of unrestrained transverse movement with respect to the fixed connecting member.

3. A diaphragm adapted for use as the sensitive element in a pneumatic-hydraulic valve comprising a resilient core of substantially uniform thickness made of a fabric material impregnated and faced on both sides with a rubberlike substance, a pair of fixed connecting members in the form of rings, made of comparatively rigid material, between the respective adjacent side faces of which the resilient core is circumferentially bonded, the rings forming a circumference defining integral portion of the diaphragm, a pair of movable connecting members in the form of discs, made of comparatively rigid material, situated at the center of the circumferentially defined core, the adjacent side portions of which are bonded to opposite sides of the core and form an integral portion of the diaphragm, the free part of the core between the pairs of rings and discs being fulled radially during the process of manufacture of the diaphragm so as to leave the same in a normally relaxed condition which permits the movable connecting members of the diaphragm to have a limited degree of unrestrained transverse movement with respect to the fixed connecting members.

STEPHEN J. ZAND.